United States Patent [19]

Bartlett

[11] 4,365,892
[45] Dec. 28, 1982

[54] APPARATUS FOR MAKING A COPY IN ONE OF THREE SIZES OF X-RAY FILM

[76] Inventor: Norman L. Bartlett, 7017 E. 66th Ct., Tulsa, Okla. 74133

[21] Appl. No.: 88,545

[22] Filed: Oct. 26, 1979

[51] Int. Cl.³ .......................................... G03B 27/52
[52] U.S. Cl. ...................................... 355/63; 355/39
[58] Field of Search ..................... 355/18, 55, 54, 63, 355/64, 46, 39

[56] References Cited

U.S. PATENT DOCUMENTS

| | | | |
|---|---|---|---|
| 3,272,106 | 9/1966 | Czekalla | 355/64 X |
| 3,524,705 | 8/1970 | Steffen et al. | 355/63 X |
| 3,674,366 | 7/1972 | Callahan | 355/63 X |

Primary Examiner—Richard A. Wintercorn
Attorney, Agent, or Firm—Head, Johnson & Stevenson

[57] ABSTRACT

An apparatus for making a photographic reduction of various sized film negatives having a light box, a camera spaced within a housing a positioned above said light box, a removable film container, with film mounted therein, being attached in optical communication with said camera; said camera comprising a first lens, and exposure control means, a second lens, a third and fourth lens of different focal lengths mounted above said second lens, being individually pivotally positioned within said camera from a first position out of optical alignment with said first and second lenses to a second position in optical alignment with said first and second lenses.

1 Claim, 4 Drawing Figures

APPARATUS FOR MAKING A COPY IN ONE OF THREE SIZES OF X-RAY FILM

BACKGROUND OF THE INVENTION

1. Field of the Invention

The present invention relates to an apparatus for making a photographic copy of various sized x-ray film and, more particularly, to such an apparatus which utilizes a pivotal lens system.

2. Description of the Prior Art

Most hospitals use x-ray film of the size 14" by 17". However, various other sized films are also used, such as 11"×14" and 8"×10". The use of these different sized films creates storage and handling problems for the hospitals. Additionally, the Occupational Health and Safety Act (OSHA) has set forth requirements that hospitals should keep the x-rays of patients who have worked in hazardous occupations on file for 25 years after the patient's release. These regulations cause the hospitals to set aside valuable floor space for the retention of these x-rays. There is a need for a device to reduce x-ray negatives to a smaller size in order to save storage space and be able to reduce different sized x-ray film.

Various devices have been developed to reduce x-ray negatives to a smaller size. The majority of these prior art devices are large and expensive. Further, some of these devices require the operator to manually focus the device and requires the use of a special viewer to insure proper focus. This method is time consuming and is prone to human error. Also, when these devices are adjusted from one film size to another, a housing has to be raised or lowered either manually or mechanically. The housing is usually connected to the lower lens by means of a flexible bellows which is susceptible to light leaks and deterioration.

SUMMARY OF THE INVENTION

The present invention generally provides a daylight copier system that makes a direct photographic copy or reductions of various sized x-ray film that is simple to manufacture and to use. Further, the present invention does not require manual focusing.

The apparatus is comprised of a light box with a plurality of light sources spaced beneath a translucent top panel and a camera spaced within a housing, which is positioned above the light box. A film container, with film mounted therein, is attached to the top portion of the housing. The camera has a first and second open-ended housing with the second housing being adapted to slide vertically within the flat housing. A first lens, a diaphram and a shutter mechanism are mounted within the lower portion of the second housing. A device is provided to move the second housing vertically within the first housing. A second lens is mounted above the first lens and is in optical alignment therewith. The third and fourth lenses, of different focal lengths, are mounted above the second lens and the third and fourth lenses are individually pivotally positioned within the camera from a first position in optical alignment with the first and second lenses by means of electric motors. Electrical logic circuitry is provided within the apparatus which positions the second housing and the third and fourth lenses in predetermined positions to produce a reduced image upon the film for each of various sized film negatives.

DETAILED DESCRIPTION OF THE PREFERRED EMBODIMENT

Figure 1:
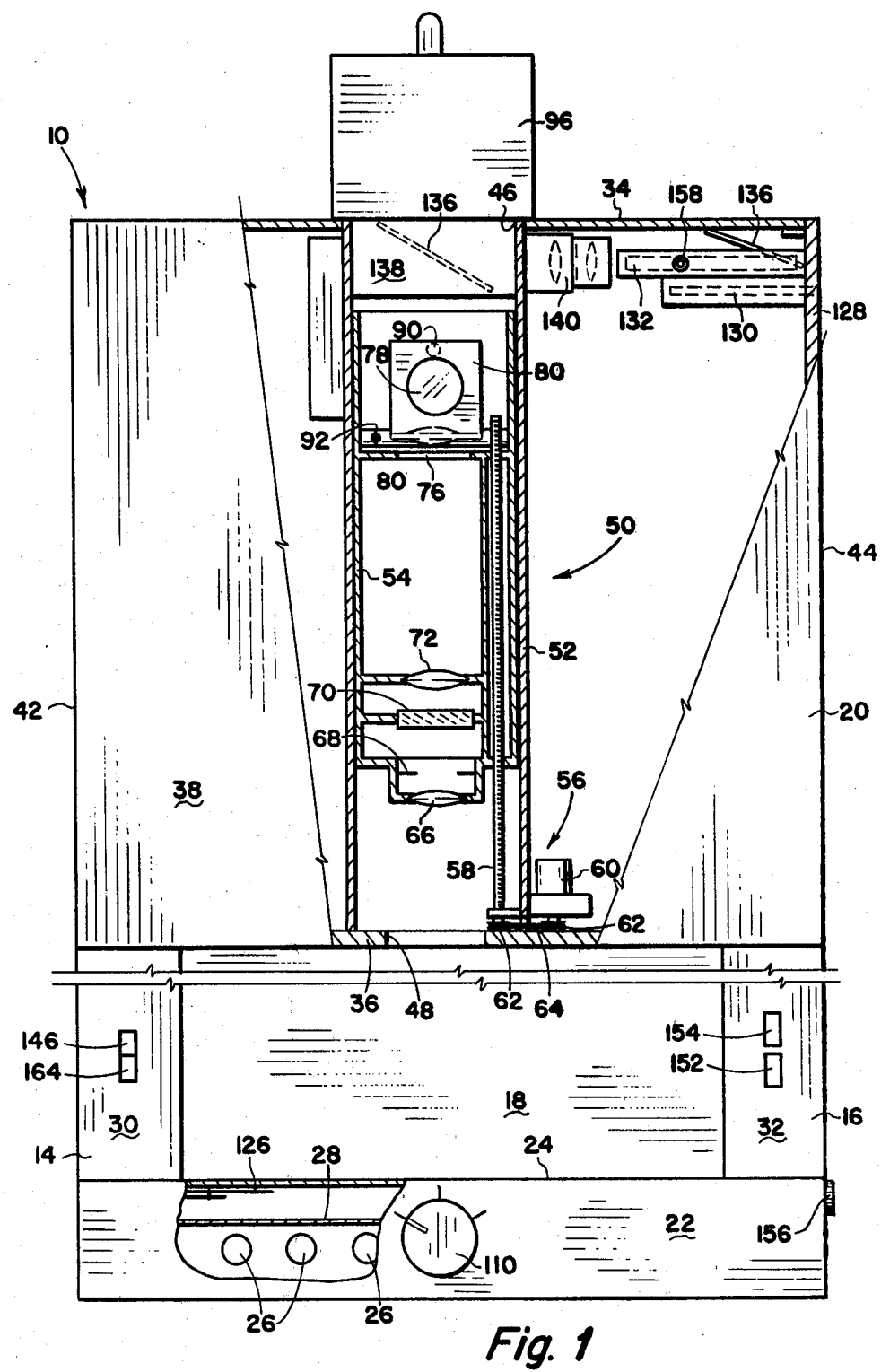
FIG. 1 is a front partial cut-away view of an apparatus for making photographic copy of various sized film negatives embodying the present invention.

Referring to the drawings in detail, reference character 10 generally indicates that an apparatus for making a photographic copy of various sized x-ray film may be constructed from wood or other similar sources of material. As shown in FIG. 1, the apparatus 10 is substantially rectangular in shape and is comprised of a lower housing or light box 12, a left vertical support 14, a right vertical support 16, a vertical back housing 18, and an upper rectangular housing 20. The light box 12 is generally rectangular in shape and is provided with a front panel 22 and a translucent top panel 24 mounted thereon. Panel 24 is made of frosted glass or some other similar material, such as white translucent plastic. A plurality of light sources 26 are mounted within the light box 12 and spaced beneath a second translucent panel 28, which is mounted below the top panel 24. A ballast (not shown) for the light sources 26 and a fan (not shown) to cool the ballast are spaced within the back housing 18.

The left vertical support 14 is provided with a front panel 30 and the right vertical support 16 is provided with a front panel 32. The upper housing 20 is attached to the supports 14 and 16 and is positioned above the light box 12. The upper housing 20 is provided with a top panel 34, a bottom panel 36, a front panel 38, a back panel 40, a left panel 42, and a right panel 44. The top panel 34 is provided with a centrally spaced opening 46 and the bottom panel 36 is provide with a centrally spaced opening 48.

A camera means 50 is spaced within the upper housing 20 and is in alignment with the opening 46 and 48. The camera means 50 is comprised of an elongated rectangular housing 52 and a second rectangular housing 54 spaced within the first housing 52 and adapted to slide vertically therewithin. The outside edges of the second housing 54 are provided with opaque material (not shown) in order to prevent light from leaking between the housings 52 and 54. A screw jack means 56 provides vertical movement to the second housing 54. The screw jack means 56 is comprised of an elongated threaded shaft 58, which passes vertically through the second housing 54 adjacent a side edge thereof, an electric motor 60, pulleys 62 which are spaced on the end of the shaft 58 and the motor 60, and a belt that passes around the pulleys 62.

Figure 2:
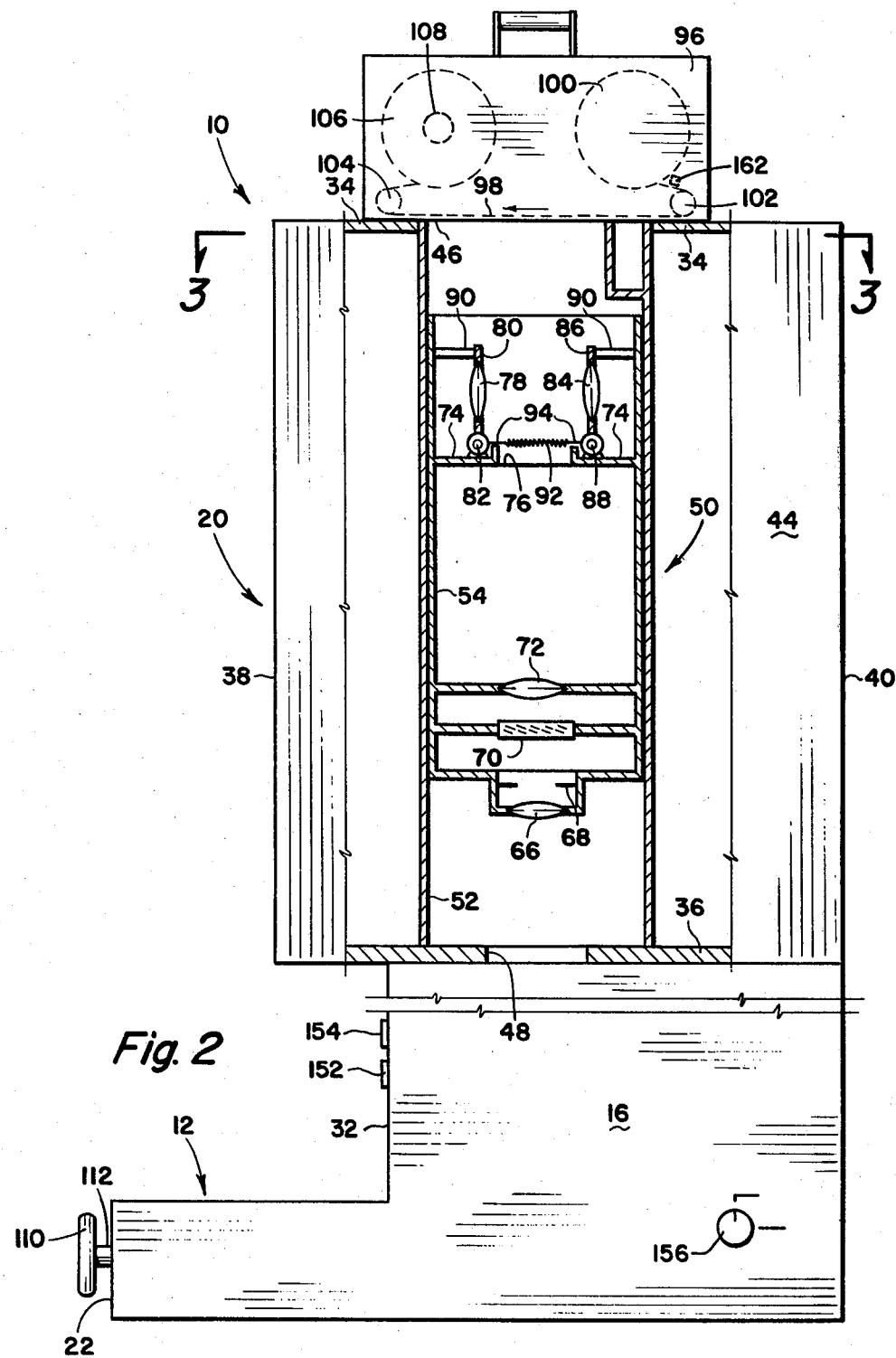
FIG. 2 is a right side partial cut-away view of the apparatus.

As best shown in FIG. 2, first lens 66 is mounted in the lower portion of the second housing 54 and is in optical alignment with the opening 48 and the lower panel 36. A pre-set diaphram or iris 68 which controls the "f"-stop of the camera means 50 is spaced within the second housing 54 above and adjacent to the first lens 66. An electronic shutter means 70 is spaced within the second housing 54 above the iris 68 and in optical alignment therewith. The operation of the electronic shutter means 70 will be described more fully herein below. A second lens 72 is spaced above the electronic shutter means 70 and in optical alignment with the first lens 66. A horizontal brace 74 is spaced within a rectangular frame 80, which is in turn mounted to a pivot shaft motor 82. The motor 82 is mounted to the brace 74 parallel with the front panel 38 of the upper housing 20. A fourth lens 84, of different focal length than the third lens 78, is mounted within a rectangular frame 86, which is in turn mounted to a shaft motor 88. The shaft motor 88 is mounted to the brace 74 parallel to the third lens 78 and on the opposite side of the opening 76. When the frames 80 and 86 are placed in the vertical position by means of the motors 82 and 88, as shown in FIG. 2, the frames 80 and 86 rest against short horizontal braces 90, which are mounted within the second housing 54. A spring 92 is spaced between the motors 82 and 88 and is provided with short lengths of string 94 extending from the ends of the spring 94, which in turn are wound around the shafts of the motors 82 and 88 when either are rotated and further, the spring 92 and strings 94 provide resistance to maintain the frames 80 and 86 in a vertical position when at rest. As this can be seen, either of the lenses 78 or 84 may be independently rotated by means of the motors 82 and 88 into a horizontal position and into optical alignment with the lenses 66 and 72. However, only one lens, either 78 or 84, may be placed in a horizontal position at one time.

A light-proof film container 96 is attached to the top panel 34 and in communication with the opening 46 therein. The film container 96 when mounted on the housing 20 rests upon short rails (not shown) which prevent light from entering the camera 50 from around the film container 96 and holds the container 96 in place. An opening (not shown) is spaced in the underside of the film container 96. As shown by dotted lines within the film container 96 in FIG. 2, photographic film 98 is mounted on a spool 100 and is threaded therefrom around an idler roller 102, around a second idler roller 104 and onto a take-up spool 106. The take-up spool 106 is provided with a center shaft motor 108, which provides means to advance the film 98. The second idler roller 104 is in communication with a counter (not shown) which deactivates the motor 108 after the roller 104 has made a predetermined number of revolutions which correspond to advancing the film 98 a sufficient distance to center the next frame above the camera 50.

A knob 110 extends from the front panel 22 of the light box 12 and is attached to the end of a shaft 112, which passes through the front panel 22. A gear 114 is mounted on the opposite end of the shaft 112 and is in communication with a horizontal gear and pulley 116, which is spaced within the front portion of the light box 12. A cam 118 is provided on the shaft 112 adjacent to the gear 114 and as the shaft 112 is rotated, the cam 118 comes into contact with the plurality of spaced micro switches 120 and 122. The function of the micro switches 120 and 122 will be described more fully herein below. A cable 124 passes around and is secured to the pulley 116 and is in communication with a plurality of horizontal blades 126, which are spaced within the light box 12 and adjacent to the top panel 24. The function of the blades 126 will be described more fully hereinbelow with the description of the operation of the apparatus 10.

Figure 3:
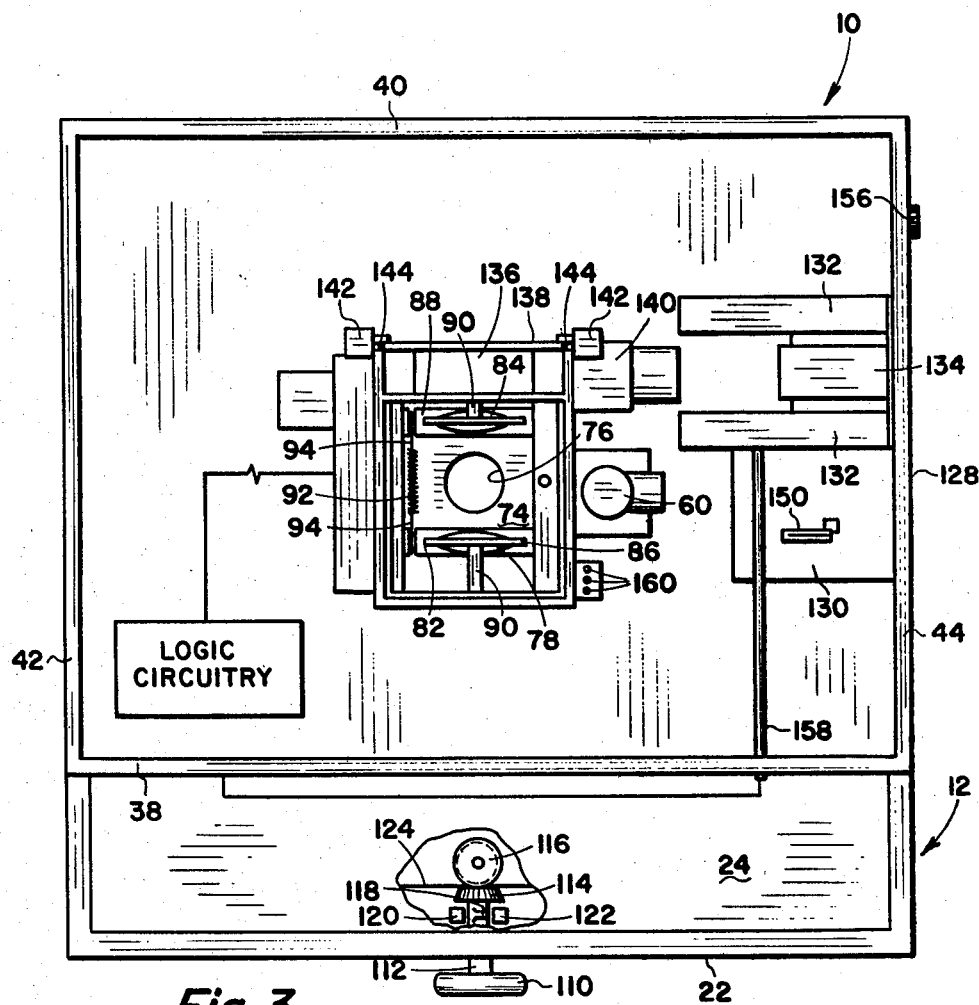
FIG. 3 is a top plan view of the apparatus taken along line 3—3 of FIG. 2.

A separate camera mechanism is provided within the top portion of the housing 20 and is adapted to photographically transfer identification information from an envelope (not shown) onto the photographic film 98 simultaneously as an exposure is made by the camera 50. As shown in FIGS. 1 and 3, a horizontal slot 128 is provided in the top portion of the right panel 44 of the housing 20. The envelope with the identification information typed thereon is inserted face up into the slot 128 and is received between horizontal parallel braces 130, which are spaced within the top portion of the housing 23. A plurality of light sources 132 are spaced within the upper portion of the housing 20 and are adapted to illuminate the identification information on the inserted envelope. The identification information on the envelope when properly inserted lies between the light sources 132 and beneath a first inclined mirror 134. A second inclined mirror 136 is spaced within the top portion of the first housing 52 within a regulated rectangular open top housing 138. A secondary camera means 140 is attached to the top portion of the first housing 52 and in alignment with an opening (not shown) in the first housing 52, which opens into the segregated housing 138. As can be seen, the printed identification information on the envelope is optically transferred by way of the mirror 136 through the camera 140 to the second mirror 136 and then upwards onto the film 98. A plurality of light sources 142 are spaced on either side of the back portion of the segregated housing 140 and transmit light vertically through openings 144 onto the film 98. The function of the light sources 142 will be described more fully hereinbelow.

The apparatus 10 is adapted to make a reduced size copy of various sized x-ray negatives. Hospital x-rays usually are of the size 14 inches by 17 inches; however, 11 inches by 14 inches and 8 inches by 10 inches sized film are frequently used.

When a reduced copy of an x-ray film negative (not shown) is to be made, the x-ray film negative is placed on top of the translucent top panel 24 of the light box 12. An "on/off" button 146, which is mounted on the front face 30 of the left support 14, is activated which transmits electrical power to a logic circuitry means 148, which is spaced within the upper housing 20. When the button 146 is pressed, the light sources 26 within the light box 12 are activated. The knob 110 is then rotated to one of a plurality of pre-set positions which correspond to a size of x-ray negative. As the knob 110 is rotated, the blades 126 are moved into a masking position which defines a light pathway corresponding to the size of the film negative chosen. The blades 126 act as a masking means which prevents light from the light sources 26 from flooding the image from around the sides of the x-ray negative, thereby masking the negative to insure proper exposure and clarity.

As the knob 110 is rotated, the cam 118 on the shaft 112 alternately comes into contact with the micro switches 120 and 122. The micro switches 120 and 122 are in communication with the logic circuitry means 148, which causes the second housing 54 and the third lens 78 and fourth lens 84 to be positioned into predetermined positions to produce a reduced image of an x-ray film negative on the film 98. For example, to make a reduced sized image of a 14" by 17" x-ray film negative, the knob 110 would be rotated to the 14" by 17" position thereby depressing the switch 120, the logic circuitry 148 then activates the screw jack means 56 to lower the second housing 54 to the lowest pre-set position and would raise the lens 78 is the lens 78 was lowered and would activate the shaft motor 82, thereby placing the fourth lens 84 into a horizontal position in optical alignment with the first lens 66 and the second lens 72. To make a reduced image of a 10″ by 14″ film negative, the knob 110 would be rotated to a second pre-set position and the logic circuitry means 148 would activate the screw jack means 56 and would raise the second housing 54 a predetermined partial distance and would raise both of the lenses 78 and 84, if either of the lenses 78 and 84 were in the horizontal position. To make a reduced image of a 8″ by 10″ sized x-ray negative, the knob 110 would be rotated to the third of the pre-set positions thereby having the cam 118 depressing the switch 122 and causing the logic circuitry means 148 to activate the screw jack means 56 which would raise the second housing 54 to the uppermost pre-set position and would raise the lens 84, if the lens 84 was in the horizontal position, and would activate the shaft motor 88 thereby placing the fourth lens 84 into the horizontal position.

When an envelope is inserted into the slot 128, the micro switch 150 is activated which in turn activates a light 152, which is mounted on the front panel 32 of the right support 16, thereby providing visual indication to the apparatus operator that the envelope is properly inserted. After the knob 110 has been rotated to the pre-set position which corresponds to the size of the x-ray negative to be photographically reduced, an exposure button 154, which is mounted on the front panel 32 on the right support 16 and which is in communication with the logic circuitry means 148, is activated. When depressed, the button 154, through the logic circuitry means 148, activates the identification lights 132 and activates the shutter means 70 within the camera 50 and activates a shutter (not shown) within the secondary camera 140 thereby producing an exposure on the film 98 as shown in FIG. 4.

The duration of the exposure, which controls the contrast of the image on the film 98, can be adjusted by means of an exposure control 156, which is mounted on the right side of the light box 12 and which is in communication with the electronic shutter means 70. A light tube 158 extends from a first of the lights 132, through the front panel 38 of the upper housing 20, thereby giving positive indication that the lights 132 are operating. After the exposure has been made, the logic circuitry 148 through a plurality of electrical contacts 160, which are mounted to the upper portion of the housing 150 and in communication with plurality of contacts (not shown) mounted on the underside of the film container 96, activates the film advance motor 108. As described above, after the counter roller 104 has rotated a predetermined number of revolutions, the film advance motor 108 is de-activated. A micro switch 162 is provided between the spool 100 and the idler roller 102 and is adapted to be in contact with the film 98. When the film 98 has been unwound from the film 100, a contact (not shown) on the micro switch 162 opens thereby activating a combination light/button 164 which is mounted on the front panel 30 of the left support 14. The light/button 164 indicates to the operator that the film 98 within the film container 96 has been fully advanced. Also, if the light/button 164 is pressed, the logic circuitry means 148 will cause the film advance motor 108 to advance the film 98 one frame.

Figure 4:
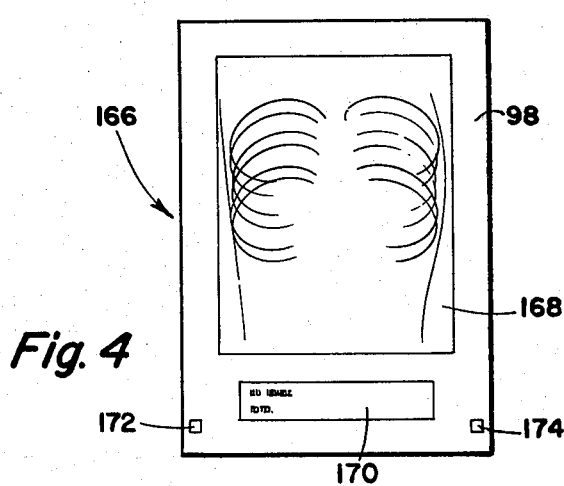
FIG. 4 is a top plan view of an exposed film negative made by the apparatus.

As shown in FIG. 4, an exposed frame 166 of the film 98 has a reduced sized image 168 of the x-ray negative which is provided by the camera means 50 and identification information 170 exposed thereonto by means of the secondary camera 140. Further, each time the exposure button 154 is activated, a first of the light sources 142 exposes a small "dot" 172 onto the frame 166 through the opening 144 in the segregated housing 138. The exposure mark or "dot" 172 corresponds to an individual exposure of a film negative and after the film 98 has been fully exposed and processed, the film 98 is inserted into an automatic film cutter (not shown). The "dot" 172 is sensed by means within the film cutter which automatically cuts the film 98 into individual exposed frames 166. Each time an envelope is inserted into the slot 128, the switch 150 is activated and causes a second of the light sources 142 to expose a small mark or "dot" 174 on the exposed frame 166, on the opposite side of the frame 166 as the exposure mark 172. The exposure mark 174 corresponds to the beginning or the end of an individual's x-ray negatives to be reduced and will be sensed by the automatic film cutter, which will in turn pre-sort the exposed frames 166 into individual patient piles.

Whereas the present invention has been described in particular relation to the drawings attached hereto, it should be understood that other and further modifications of the invention, apart from those shown or suggested herein, may be made within the scope and spirit of this invention.

What is claimed is:

1. An apparatus for making a photographic reduction of various sized film negatives having a light box, an upper housing positioned above said light box and being provided with an opening in the bottom thereof, a camera spaced within said housing and in communication with said opening, and a film container, with film mounted therein, being attached to said housing in optical communication with said camera; said light box comprising: a cabinet with a plurality of light sources spaced therein, and a translucent panel attached to the top of said cabinet;

said camera comprising:
  a first open-ended housing;
  a second open-ended housing spaced within said first housing and being adapted to slide there within;
  a primary lens, diaphragm, and shutter means in optical alignment with said film;
  at least two secondary lenses, each of different focal lengths mounted within said second housing above said primary lens, each of said secondary lenses being individually positioned within said camera from a first position out of optical alignment with said primary lenses to a second position in optical alignment therewith;
means to provide movement to said second housing;
means to pivot said secondary lenses;
means to advance said film; and
control means mounted within said apparatus to place said second housing and said secondary lenses in predetermined positions to produce a reduced image upon said film for each of various sized film negatives, a secondary camera mounted to said first housing of said camera whereby identification information is exposed on a peripheral portion of said film simultaneously as an exposure is made by said camera.

* * * * *